United States Patent [19]

Scudner, Jr.

[11] 4,396,970

[45] Aug. 2, 1983

[54] OVERVOLTAGE SURGE ARRESTER WITH PREDETERMINED CREEPAGE PATH

[75] Inventor: Frank G. Scudner, Jr., Sag Harbor, N.Y.

[73] Assignee: TII Industries Inc., Copiague, N.Y.

[21] Appl. No.: 224,467

[22] Filed: Jan. 12, 1981

[51] Int. Cl.[3] .............. H02H 9/06

[52] U.S. Cl. .............. 361/127; 361/117; 361/129

[58] Field of Search .............. 361/117, 119, 120, 127, 361/129

[56] References Cited

U.S. PATENT DOCUMENTS

| | | | |
|---|---|---|---|
| 3,259,780 | 7/1966 | Stetson | 361/128 X |
| 3,519,878 | 7/1970 | McStrack et al. | 361/128 |
| 3,626,237 | 12/1971 | Bolton et al. | 361/117 X |
| 3,710,187 | 1/1973 | Harnden, Jr. | 361/38 |
| 3,859,569 | 1/1975 | Kresge | 361/128 |
| 3,863,111 | 1/1975 | Martzloff | 361/119 |
| 3,881,766 | 5/1975 | Pratsch | 361/115 |
| 3,967,160 | 6/1976 | Kresge et al. | 361/128 |
| 4,035,693 | 7/1977 | Luxa et al. | 361/120 |
| 4,092,694 | 5/1978 | Stetson | 361/127 |
| 4,100,588 | 7/1978 | Kresge | 361/126 |
| 4,156,886 | 5/1979 | Jones | 361/129 X |
| 4,262,318 | 4/1981 | Shirakawa et al. | 361/127 |

FOREIGN PATENT DOCUMENTS 2355426 5/1975 Fed. Rep. of Germany .

*Primary Examiner*—Reinhard J. Eisenzopf
*Attorney, Agent, or Firm*—Martin Sachs

[57] ABSTRACT

An overvoltage surge arrester which has a reduced turn on time and is suitable for use at low voltage levels to protect electronic equipment, such as telephone repeaters and the like; this protective device includes a core of semiconductor material provided with a predetermined surface creepage path thereacross and electrically conductive terminals (electrodes) disposed on each end thereof. The conductive terminals or electrodes may extend towards each other to provide a secondary, backup discharge gap. The surge arrester may be used as an integral part of a gas filled device with the conductive electrodes connected between a line electrode and ground electrode thereof.

19 Claims, 8 Drawing Figures

OVERVOLTAGE SURGE ARRESTER WITH PREDETERMINED CREEPAGE PATH

BACKGROUND OF THE INVENTION

1. Field of the Invention

The present invention relates to overvoltage protectors and, in particular, relates to a low voltage surge arrester utilizing a semiconductor core to provide a predetermined surface creepage path which may be utilized in combination with a gas-filled electron tube type arrester.

2. Description of the Relevant Art

The art abounds with devices specifically designed for the protection of electronic equipment, which may be subject to overvoltage caused by lightning, high voltage line surges, external high voltage line contact, and the like. These devices utilize either separately or in combination, e.g. air gap arresters, gas tubes, carbon piles, metal oxide varistors, semiconductor devices, etc. These devices are utilized either separately or in combination in an attempt to provide instantaneous protection of the electronic equipment. However, each device has an inherent time lag either before it is able to break down or effect the reduction of the excess voltage. In addition, each type device has its own characteristic with regard to the amount of current it can safely bypass without becoming destroyed. Consequently, when sustained high voltages and currents are present, supplementary devices are required, e.g. a fusible link may be utilized to provide a short circuit until the fuse is vaporized, a shorting bar may be utilized, and when activated is applied across the load to handle the excessive surge currents, etc. Generally, these supplementary devices are expendable and require replacement once utilized.

The gas tube arrester has proven rather satisfactory for most applications, however, since it electrically responds only to voltages generally greater than 70 volts and it has an inherent time lag before igniting, other devices have been utilized in combination therewith to absorb any surge voltage or current until the gas arrester can absorb the major portion of the voltage surge.

A typical electrical overvoltage surge arrester is disclosed in U.S. Pat. No. 4,100,588 issued to Kresge on July 11, 1978. The arrester includes an insulating housing with end terminals and a plurality of varistors disposed within the housing and electrically connected between the terminals. The varistors are provided with a heat transfer and sinking collar which is electrically insulating and thermally conducting. The collar preferably is in thermally conductive contact with the inside wall of the housing to improve heat transfer to the housing. The collar configuration is such that when it is installed in the housing a passageway is provided therethrough, so that a longitudinal air space exists for the accommodation of arcing and for the venting of gas in the event of an arrester failure.

German Offenlegungsschrift No. 23 55 426 issued to Peche on May 15, 1975, discloses an overvoltage suppressor which includes two cupped shaped electrodes hermetically sealed to the ends of a tubular housing. The housing is made from a semiconductor material, preferably an oxide of zinc, titanium, copper and/or iron, which is doped with an oxide of bismuth or cobalt. The housing itself is filled with a noble gas.

It is an object of the present invention to provide a low voltage surge arrester that is capable of responding to overvoltage surges faster than devices known heretofore.

It is a further object of the present invention to provide a low voltage surge arrester that may respond to overvoltage surges in less than 1 micro-second.

It is another object of the present invention to provide a low voltage surge arrester which is small in size, economical to manufacture, and has the capability of protective response at relatively low voltages.

It is another object of the present invention to provide a low voltage surge arrester which has a relatively low firing voltage that is repeatable within narrowly defined limits and is capable of handling high surge currents.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

SUMMARY OF THE INVENTION

A low voltage surge arrester according to the principles of the present invention, comprises at least one core member of semiconductor material having two contact surfaces. The core member is provided with a predetermined surface creepage path thereacross. A pair of electrodes are in electrically conductive contact with each of the contact surfaces. The electrodes are formed to extend towards each other to form a predetermined gap therebetween.

The present invention also utilizes the gas ionization enhancement provided by spark breakdown at the controlled creepage path upon the surface of the semiconductive material.

Although the invention is illustrated and described herein as a low voltage surge arrester with a predetermined surface creepage path and a secondary spark gap, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

In order that the invention may be more fully understood, it will be described, by way of example, with reference to the accompanying drawing in which.

DESCRIPTION OF THE PREFERRED EMBODIMENTS

Figure 1:
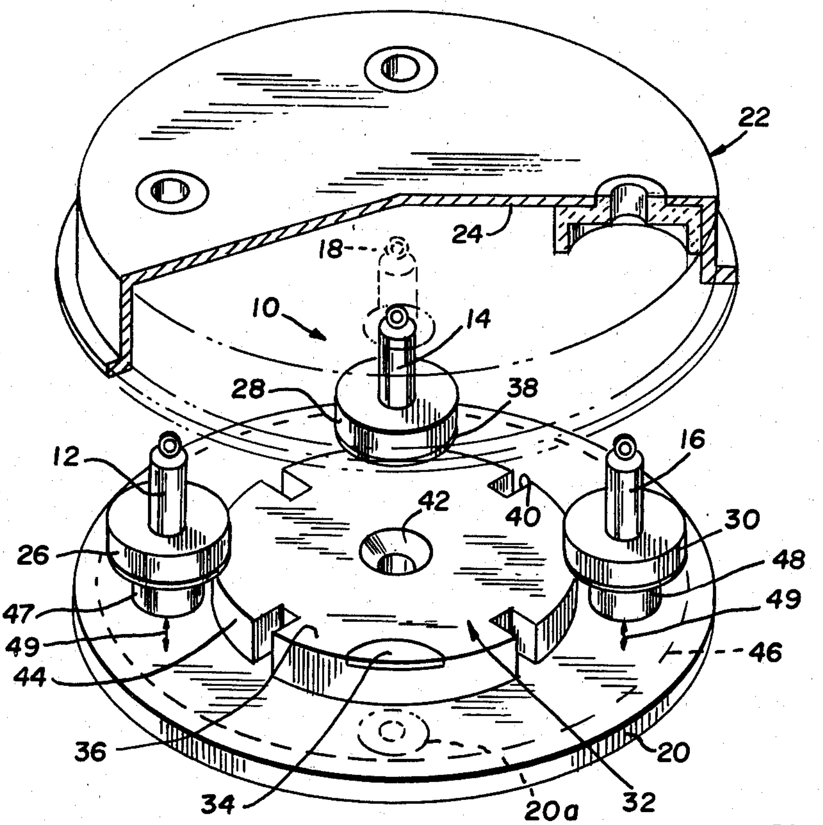
FIG. 1 is an exploded isometric view of the embodiment of a low voltage surge arrester, according to the principles of the present invention.

Referring now to the figures and in particular to FIG. 1, which discloses an isometric view of one embodiment of a low voltage surge arrester 10, that incorporates the principles of the present invention. The surge arrester 10 includes a plurality of electrically conductive terminals or electrodes 12, 14, 16, 18 and 20. Terminals 12, 14, 16 and 18 are affixed in the cover or hat portion 22 of the arrester 10. The terminals 12, 14, 16 and 18 are insulatedly affixed, in a conventional manner, in the cover 22 and extend downwardly from the top portion 24 thereof towards the base terminal or electrode 20. Terminal 20 in this embodiment would be connected as a common or ground terminal. The ground terminal 20 may include a lug **20*a*** centrally disposed and extending downwardly therefrom for ease in connecting a ground wire, not shown, thereto.

Preferably, the terminals or electrodes 12, 14, 16 and 18 are provided with an enlarged portion 26, 28 and 30, respectively, which are caused to come in intimate or electrically conductive contact with a semiconductor core member 32. The material of the semiconductor core member 32 is preferably silicon carbide an oxide of zinc, titanium, copper, and/or iron, which has been doped with bismuth oxide or cobalt oxide. The terminals or electrodes 12, 14, 16 and 18 are in electrically conductive contact with the core member 32 and their electrical contact conductivity may be increased if preferred by utilizing a spot-metallization 34 on the surface 36 of the core 32. Alternatively, a mica washer insulator 38, or the like, may be utilized on the surface 36 of core 32 to change the conductivity of the voltage breakdown path. The core member 32 may be provided with a plurality of slots 40 disposed about the circumference thereof in order to increase the leakage path between the terminals 12, 14, 16 and 18. The core member 32 may also be provided with a centrally disposed aperture 42 to reduce the mass of semiconductor material utilized and to position the core member on the base electrode 20 during assembly. The semiconductor core material utilized for the core member 32 is preferably a solid uniform cylindrical block of semiconductor material designed to have a voltage breakdown similar to that of a zener diode. In addition, the semiconductor surface 36 is arranged to provide a creepage path so that the length of the creepage path will determine the breakover voltage between the common terminal or electrode 20 and the other terminals or electrodes 12, 14, 16 or 18. The creepage path includes the surface 36 and the surface of the vertical height or thickness 44 of the core material 32. The slots 40 also serve to isolate the core member into discrete segments and at the same time, control the electrical characteristics of each segment.

The embodiment disclosed in FIG. 1 is capable of protecting a plurality of conductive lines to which electrical equipment may be connected. Although a four-terminal device with a common fifth terminal or electrode has been disclosed, it is readily apparent, by those knowledgeable in the art, that any number of terminals may be provided utilizing similar construction. The enlarged portion 26 of terminals 12, 14, 16 and 18 may be made to extend downwardly towards electrode 20, thereby providing a parallel back-up gap (almost equal to or smaller than the height 44 of the core member 32) capable of handling large amounts of surge currents. One method to provide this parallel gap is a downward extension from the enlarged terminals by the addition of a cylindrical segment to each electrode as illustrated by 47 and 48. The parallel gap formed between 47, 48 and 20 is shown in two places as 49 and is preferably between 0.05 millimeters and 5.0 millimeters. With the cover portion 22 affixed on the base electrode 20 as shown by the dotted line 46, a complete, sealed unit may be fabricated and backfilled with a gas atmosphere to provide the desired breakdown and discharge characteristics for the surge arrester 10.

Figure 2:
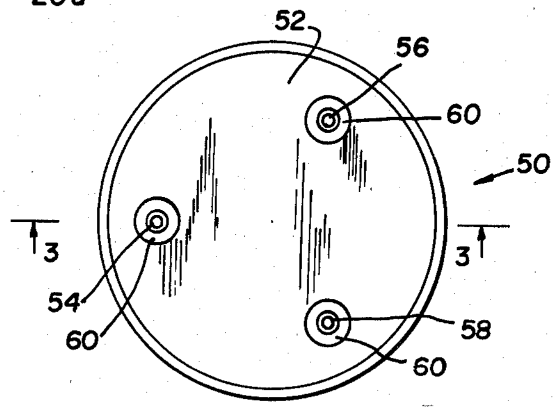
FIG. 2 is a plan view of an alternate embodiment of the present invention.
Figure 3:
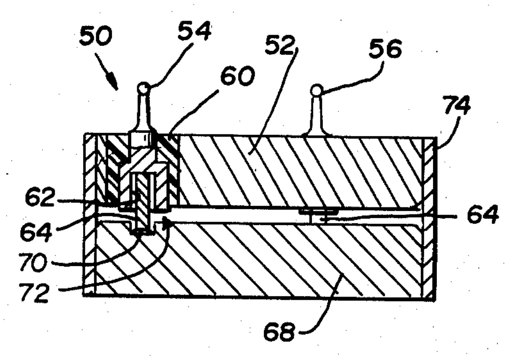
FIG. 3 is a cross-sectional view taken generally along the line 3—3 in FIG. 2.
Figure 4:
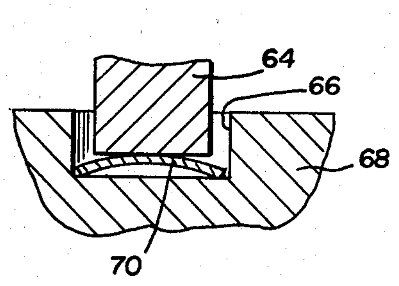
FIG. 4 is an enlarged partial corss-sectional view of the area shown in the dotted circle in FIG. 3.

A plan view of an alternate embodiment 50 of a surge arrester is shown in FIG. 2. Extending upwardly from the cover portion 52 are three terminals or electrodes 54, 56 and 58. These terminals are insulated from, and retained in the cover portion 52 by means of a glass to metal seal or a ceramic-to-metal seal 60 well known in the art. (See FIG. 3). The lower portion of the terminal or electrode 54 which typically extends into the gap area 72, is provided with a bore 62 which is adapted to receive therein a semiconductor core 64 fabricated of the same material as core member 32. The core 64 is preferably cylindrically shaped, but may be square or other geometric shape. One end of the core member 64 is maintained in intimate electrical conducting contact with the lower portion of bore hole 62. The other end of core member 64 is adapted to be received into a bore 66 provided in the common or ground electrode or terminal 68. A leaf spring 70 or equivalent pressure producing pad may be located at the bottom bore 68 in order to insure proper contact pressure between the core 64, terminal 54 and terminal 68 when the arrester 50 is assembled. Here again, a mica washer, not shown, may be inserted between either end of core member 64 and electrode 54 and electrode 68 to increase the breakover voltage. The length of core member 64 and the depth of the bores 62 and 66 determine the discharge gap 72 provided between electrode 54 and 68. This discharge gap may be designed to operate on air or other gaseous atmosphere. By utilizing a shell 74 which may either be metallic, glass, or ceramic the discharge gap 72 provided between the electrodes 54 and 68 may be sealed thus enabling a gas atmosphere to be inserted into the gap in a conventional manner, thereby determining and controlling the electrical characteristics of the arrester. When an insulative shell 74 is used, the metal cover 52 may also be used as an electrode. In the case where shell 74 is metal, then the cover 52 may be glass or ceramic, thereby eliminating the need for insulator 60. The creepage path between the electrodes has been provided along the surface of the core member 64. The core material characteristics and the length of this creepage path will determine the breakover voltage. The electrodes 54 and 68 circumscribe the ends of the core member 64 and preferably are coaxial therewith. The terminals may extend towards each other providing discharge gap 72 with a predetermined spacing therebetween. Gap 72 thus provides a path parallel to the core member which is capable of handling large surge currents by gaseous conduction following the gap breakdown.

It is understood that the electrodes 54 and 68 are to be connected across the electronic equipment to be protected.

Figure 5:
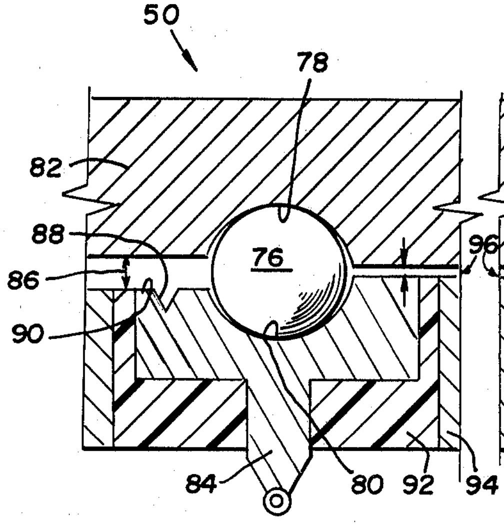
FIG. 5 is an enlarged partial cross-sectional view of another embodiment of the present invention in the area of the semiconductor.
Figure 6:
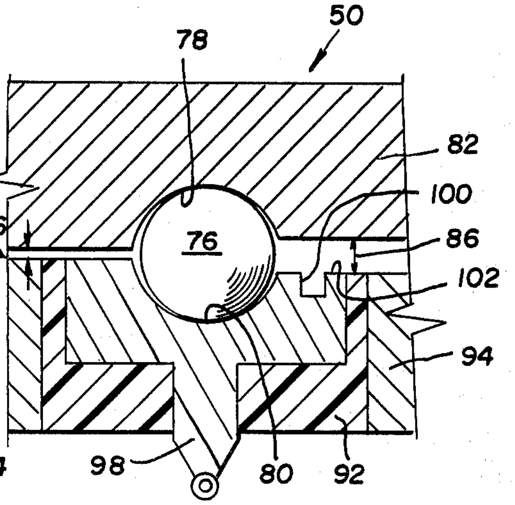
FIG. 6 is an enlarged partial cross-sectional view of yet another embodiment of the present invention in the area of the semiconductor.

Alternate embodiments of the construction of the core members and electrodes are disclosed in FIGS. 5 and 6. In FIG. 5 the core member 76 is spherical in shape and is disposed in an arcuate shaped groove 78 and 80 provided in electrodes 82 and 84, respectively. Electrode 82 may be made the common or ground electrode and electrode 84 would then, therefore, be the electrode connected to the electronic equipment to be protected. The core member 76 is permitted to be in intimate contact with the grooves 78 and 80 and provides a creepage path therebetween over its surface and in the discharge gap 86 which separates electrodes 82 and 84. Electrode 84 is also provided with a triangular-shaped notch 88 in order to reduce the immediate surface area available to any electrical discharge activity along the surface 90 of electrode 84. Terminal 84 may be embedded in an insulating (ceramic or glass type) insert 92 provided in the housing 94, which may be fabricated of metal, as the arrester 50. The gap 96 provided at the central portion of the arrester 50 is preferably made smaller than the gap 86 which is preferentially provided closer to the outer periphery of the arrester. This preferential arrangement will allow the ionization produced conduction path to remain generally confined to the smaller discharge gap 86 and move outwardly toward the circumference only as a result of an abnormal increase in the surge current.

In the embodiment shown in FIG. 6, the terminal or electrode 98 is provided with a rectangular-shaped groove 100 to reduce the immediate surface area available to any electrical discharge activity along the surface 102 of electrode 98. In all other respects the construction of arrester 50 shown in FIG. 6 is smimilar to the construction used in the arrester shown in FIG. 5 and like components have been given like numeral designations.

Figure 7:
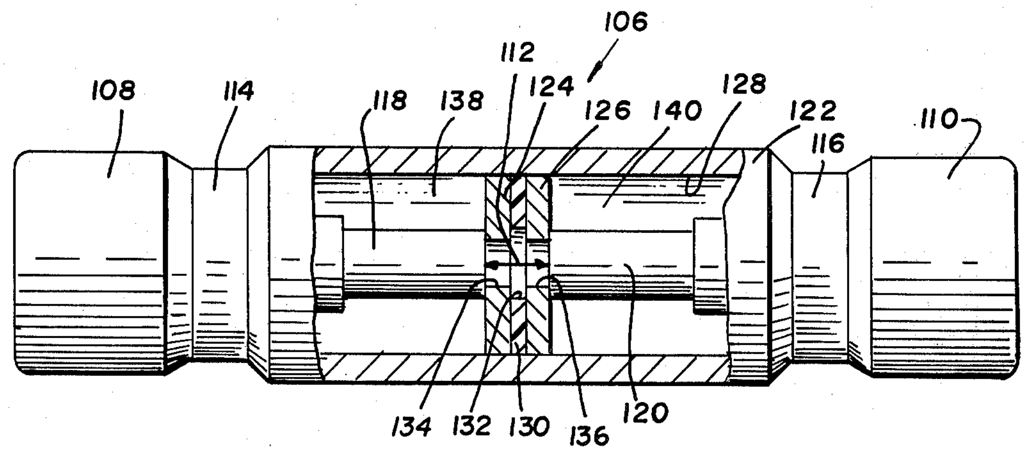
FIG. 7 is an enlarged plan view, partially broken away, of another embodiment of the present invention.
Figure 8:
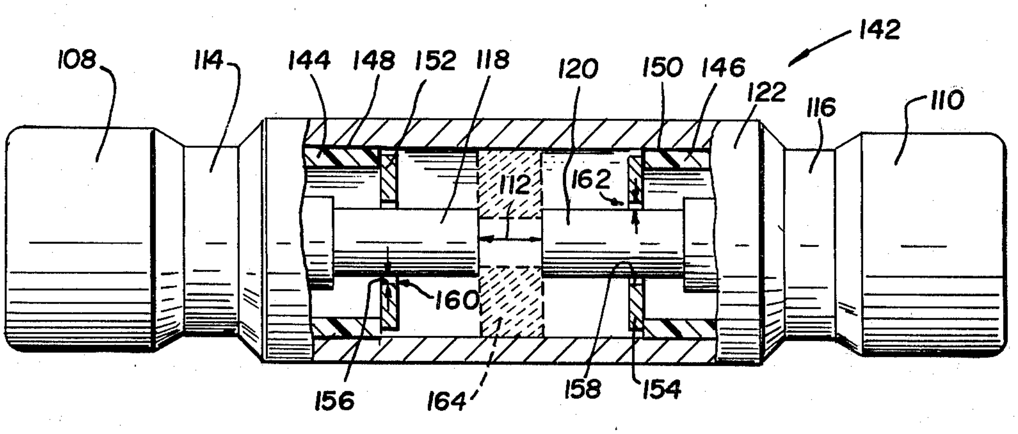
FIG. 8 is an enlarged plan view partially broken away of yet another embodiment of the present invention.

The embodiment disclosed in FIGS. 7 and 8 is an alternate configuration similar in style to a conventional gas tube arrester, such as TII Model No. 31. Referring now to FIG. 7, the arrester 106 is provided wit two end terminals 108 and 110 adapted to be received into a clip, not shown. The terminals are metallic and electrically conductive and extend inwardly towards each other leaving a central gap 112 therebetween. The terminals 108 and 110 are adapted to be received on cylindrically-shaped ceramic members 114 and 116, respectively, which position the end terminals 108 and 110 and their inwardly extending portions 118 and 120, respectively. A third electrode or ground terminal 122 is cylindrically-shaped and is adapted to fit onto the cylindrically-shaped ceramic members 114 and 116. Toroidally-shaped (washer-shaped semiconductor core members 124 and 126 are each provided with a peripheral diameter sufficiently large to be in intimate contact with the ground electrode as it is inserted into the opening 128 provided therein and insulated washer 130 is disposed between core members 124 and 126 and is provided with an aperture 132 larger than the aperture 134 and 136 provided in the core members 124 and 126, respectively. When the arrester 106 is assembled, the insulating washer 130 is sandwiched between the core members 124 and 126 and held therein in a conventional manner. Thus, a gap 112 of preferably between 0.05 and 5.0 millimeters is provided between electrodes 118 and 120, a gap 138 is provided between electrode 118 and electrode 122 and a gap 140 is provided between electrode 120 and electrode 122. In addition, a surface creepage path is provided on the surface of core members 124 and 126 providing another breakdown path affecting the breakdown characteristic of gaps 138 and 140 with gap 112 affected to a lesser extent because of the addition of the washer 130, preferably mica in addition to the zener or semiconductor breakover provided by the cores 124 and 126 themselves.

Referring now to FIG. 8, which discloses a voltage surge arrester 142 that has an outside configuration exactly the same as surge arrester 106 disclosed in FIG. 7 and like components will be given like numbers herein. Surge arrester 142 is provided with end terminals 108 and 110 which are adapted to receive hollow, cylindrically-shaped insulators 114 and 116. The inwardly extending portions 118 and 120 of terminals 108 and 110, respectively, are aligned concentrically and provide a discharge gap 112 therebetween as well as the primary discharge gaps 138 and 140, as shown in FIG. 7. The ceramic portions 114 and 116 have an inwardly extending portion 144 and 146, respectively, that is provided with metallization 148 and 150, respectively, that extends around to the end surfaces of the inwardly extending portions 144 and 146. Washers formed from semiconductor or metal oxide varistor material 152 and 154 are braised onto the metallization 148 and 150, respectively, in a coaxially disposed alignment so that the apertures 156 and 158 provided in washers 152 and 154, respectively, provide a relatively close-spaced discharge gap 160 and 162, respectively, between electrode 118 and washer 152 and electrode 120 and washer 154, respectively. These close-spaced discharge gaps will serve effectively as air gaps, should the backfilling gas be or become air. By requiring the inner diameter of ground electrode 122 to be in intimate contact with the metallization provided on the circumference of ceramic members 114 and 116 a continuous electrically conductive path is provided between electrical terminal 122 and washers 152 and 154. Alternatively, apertures 156 and 158 may be reduced so that they form a force fit or are in intimate contact with the inwardly extending electrode portions 118 and 120 of terminals 108 and 110, respectively. Thus, with the construction as presently described, a surface creepage path would appear across the semiconductor washers 152 and 154 as the voltage increases between the common terminal 122 and terminals 108 and 110. The supplemental line-to-line discharge gap 112 provides for higher voltage transient protection between corresponding lines which may be affixed to electronic equipment to be protected. Each of the lines will be protected for a much lower voltage than the line-to-line voltage with the arrangement described when electrode 122 serves as the ground return for each line.

Thus, when a voltage surge appears across terminals 108 and 122, the initial breakdown will occur to the surface creepage path, which appears to occur almost instantaneously, and the semiconductor material utilized for washer 152 will start to conduct, (breakdown) if discharge gap 160 is not present and if discharge gap 160 is present, the conducting discharge would then occur in the gap by ionizing the gas or air atmosphere therebetween. Alternatively, a single semiconductor washer 164 may be inserted between the electrodes 118 and 120 and in intimate electrical conductive contact therewith, in addition to being in conductive contact with ground terminal or electrode 122 eliminating the need for washers 152 and 154. The present configuration may typically be utilized to include a gas atmosphere since the terminals are hermetically sealed to the ceramic portions 114 and 116, in a conventional manner, however, the gas atmosphere may also be air or atmospheric air should the hermetic seal fail. A breakdown occurring between terminal 110 and 120 will occur in a similar manner. The choice of materials and the mechanical design of the elements that make up the controlled creepage path as described herein are chosen to optimize, control, and apply the generation of supplemental ionization in the creepage path area. This ionization will enhance the operating characteristics of the device.

All of the embodiments disclosed heretofore are capable of being hermetically sealed and filled with a noble gas in order to change their characteristics to conform with the required breakover voltages and each has the decided advantage of instantaneously breaking down or conducting due to a predetermined surface creepage path provided between the two terminals, one being connected to ground and the other being connected to the electronic equipment that is to be protected.

Hereinbefore has been disclosed an overvoltage surge arrester with an internal surface creepage path which is small in size, absorbs transients essentially instantaneously, and is adapted to be used to protect low voltage electronic equipment. This device may be utilized in combination with other types of known overvoltage surge arresters for additional back-up protection. Obviously, the present invention may be used in conjunction with gas tube arresters having more or less than the number of electrodes than those disclosed. The ability to provide a low voltage arrester to be utilized with multiple electrical terminals is obvious to one skilled in the art. These modifications and others may be made by those skilled in the art without departing from the scope and spirit of the present invention as set forth in the appended claims.

Having thus set forth the nature of the invention, what is claimed is:

1. A low voltage surge arrester, comprising:
(a) at lease one core member of semiconductor material having two contact surfaces, said core member being provided with a predetermined surface creepage path thereacross; and
(b) a pair of electrodes, one of said pair of electrodes being in electrically conductive contact with a respective one of said contact surfaces of the core member, said electrodes extending towards each other forming a predetermined discharge gap therebetween; and
(c) spring means disposed between at least one electrode and said semiconductor material to insure electrical contact between said electrodes and said semiconductor material.

2. The arrester according to claim 1 further including an insulating spacer disposed between said semiconductor material and one of said electrodes.

3. The arrester according to claim 1 further including an insulating housing enclosing said semiconductor material and said discharge gap in intimate contact with said electrodes.

4. The arrester according to claim 3 further including a gas disposed within said housing, said housing being hermetically sealed to said electrodes.

5. An low voltage surge arrester comprising:
(a) a solid cylindrically-shaped core of semiconductor material having a predetermined surface creepage path; and
(b) first and second cup-shaped electrodes disposed on both ends of said core, said electrodes being in electrical conducting contact with said semiconductor core material, extending over the ends thereof and separated by a predetermined distance to form a gap therebetween.

6. A low voltage surge arrester, comprising:
(a) an electrically conductive base member;
(b) a semiconductor core member centrally disposed on and in intimate conductive contact with said base member; and
(c) a plurality of conductive electrodes in electrical contact with said core member and disposed proximate the outer edge of said core member providing a predetermined surface creepage path from each said electrode and across the surface of said core member to said base member.

7. A low voltage surge arrester accordng to claim 6 further including a cover portion hermetically sealed to said base portion and each said electrode, said cover portion providing an insulating medium around each said electrode to prevent conductivity therebetween.

8. A surge arrester according to claim 7 further including gas disposed within said volume encompassed by said cover and base portions.

9. A surge arrester according to claim 6 further including a plurality of core members disposed between each said respective electrode and said base portion.

10. A surge arrester according to claim 9 wherein said core members are cylindrically shaped.

11. A surge arrester according to claim 9 wherein said core member is spherically-shaped.

12. A surge arrester according to claim 9 wherein said core member is generally rectangularly shaped.

13. An overvoltage surge arrester, comprising:
(a) a pair of metallic terminals extending towards each other and providing a gap therebetween;
(b) a common terminal spaced away from said pair of metallic terminals and concentric therewith; and
(c) a pair of semiconductor washers having an insulator disposed therebetween and positioned within said gap, the circumference of said washers in electrical conductive contact with said common terminal providing a predetermined surface creepage path between said common terminal and said end terminals.

14. An overvoltage surge arrester comprising:
(a) a pair of metallic terminals extending towards each other and providing a gap therebetween;
(b) a common terminal spaced away from said pair of metallic terminals and concentric therewith; and
(c) a pair of semiconductor washers, each in electrically conductive contact with said common terminal and concentric with said end terminals, said semiconductor washers having a centrally disposed aperture each circumscribing one of said pair of terminals.

15. A surge arrester according to claim 14 wherein one of said semiconductor washers is in conductive contact with each said pair of terminals.

16. An overvoltage surge arrestor according to claims 13 or 14 wherein said common terminal and said pair of terminals are hermetically sealed to an insulating concentric cylinder.

17. A surge arrester according to claims 13 or 14 further including a gas within the volume of said common concentric terminal.

18. A low voltage surge arrester, comprising:

(a) at least one core member of semiconductor material having two contact surfaces, said core member being provided with a predetermined surface creepage path thereacross;

(b) a pair of electrodes, one of said pair of electrodes being an electrically conductive contact with a respective one of said contact surfaces of the core member, said electrodes extending towards each other forming a predetermined discharge gap therebetween; and (c) insulating spacing means disposed between said semiconductor material and one of said electrodes.

19. A low voltage surge arrester, comprising:

(a) at least one core member of semiconductor material having two contact surfaces, said core member being provided with a predetermined surface creepage path thereacross;

(b) a pair of electrodes, one of said pair of electrodes being an electrically conductive contact with a respective one of said contact surfaces of the core member, said electrodes extending towards each other forming a predetermined discharge gap therebetween; and (c) insulated housing means enclosing said semiconductor material and said discharge gap in intimate contact with said electrodes.

* * * * *